(12) United States Patent
Keller et al.

(10) Patent No.: US 6,697,184 B1
(45) Date of Patent: Feb. 24, 2004

(54) METHOD AND SYSTEM FOR STEERING A COLLIMATED LIGHT BEAM WITH A PIVOTABLE MIRROR

(75) Inventors: Robert C. Keller, Plano, TX (US); Luisa Angelica Zepeda, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/060,949

(22) Filed: Jan. 29, 2002

(51) Int. Cl.$^7$ ............................................... G02B 26/08
(52) U.S. Cl. ................. 359/212; 359/198; 359/199; 359/213; 359/214; 359/223; 359/226; 359/641
(58) Field of Search ................................ 359/196–226, 359/641; 347/258–259, 244

(56) References Cited

U.S. PATENT DOCUMENTS 6,034,804 A * 3/2000 Bashkansky et al. ....... 359/201

* cited by examiner

*Primary Examiner*—James Phan
(74) *Attorney, Agent, or Firm*—William B. Kempler; W. James Brady, III; Frederick J. Telecky, Jr.

(57) ABSTRACT

An optical system 200 includes a light source 202, such as a laser diode. A rotatable mirror 208 is positioned to receive a light beam 220 from the light source 202. A collimating lens 218 is positioned to receive a reflected light beam 222 from the rotatable mirror 208. The collimating lens 218 preferably has a focal length that is about equal to the sum of the distance between the light source 202 and the mirror 208 and the mirror 208 and the lens 218.

7 Claims, 4 Drawing Sheets

METHOD AND SYSTEM FOR STEERING A COLLIMATED LIGHT BEAM WITH A PIVOTABLE MIRROR

FIELD OF THE INVENTION

This invention relates generally to optical systems, and more particularly to a method and system for steering a collimated light beam with a rotatable mirror.

BACKGROUND OF THE INVENTION

Optical systems are used in a wide variety of contexts. One example is in communications systems where light is modulated to carry information. Optical carriers are useful due to the high bandwidth associated with the signals. As a result, telecommunications systems, at least for long haul applications, have become predominantly optical.

A relatively new technology that has been proposed for data communications is the optical wireless network. According to this approach, data is transmitted by way of modulation of a light beam, in much the same manner as in the case of fiber optic telephone communications. A photo-receiver receives the modulated light, and demodulates the signal to retrieve the data. As opposed to fiber optic-based optical communications, however, this approach does not use a physical wire for transmission of the light signal. In the case of directed optical communications, a line-of-sight relationship between the transmitter and the receiver permits a modulated light beam, such as that produced by a laser, to travel without the use of an optical fiber as a waveguide. Optical wireless communications is inherently secure because in order to snoop on the transmission, the transmission would need to be broken. A broken transmission link is readily detected.

It is contemplated that the optical wireless network according to this approach will provide numerous important advantages. First, high frequency light can provide high bandwidth, for example ranging from on the order of 100 mega bits-per-second (Mbps) to several giga-bits-per-second (Gbps), when using conventional technology. Additionally, this high bandwidth need not be shared among users, when carried out over line-of-sight optical communications between transmitters and receivers. Without other users on the link, of course, the bandwidth is not limited by interference from other users, as in the case of wireless telephony. Modulation can also be quite simple, as compared with multiple-user communications that require time or code multiplexing to permit multiple simultaneous communications. Bi-directional communication can also be readily carried out according to this technology. Finally, optical frequencies are currently not regulated, and as such no licensing is required for the deployment of such networks.

These attributes of optical wireless networks make this technology attractive both for local networks within a building, and also for external networks between buildings. Indeed, it is contemplated that optical wireless communications may be useful in data communication within a room, such as for communicating video signals from a computer to a display device, such as a video projector.

SUMMARY OF THE INVENTION

The present invention provides a configuration of components that can be used in an optical wireless network, as well as in a wide variety of other contexts. In a first aspect, an optical system includes a light source, such as a laser diode. A rotatable mirror is positioned to receive a light beam from the light source. A collimating lens is positioned to receive a reflected light beam from the rotatable mirror. The collimating lens preferably has a focal length that is about equal to the sum of the distance between the light source and the mirror and the mirror and the lens.

In another aspect, the present invention provides an optical system that includes a light collection device, such as a photodetector (e.g., a photodiode). A rotatable mirror is positioned to direct a light beam toward the light collection device. A lens is positioned to transmit a received light beam toward the rotatable mirror. The lens has a focal length that is about equal to the sum of the distance between the light collection device and the mirror and the mirror and the lens.

In these two embodiments, the area of the mirror does not limit the area of light that can be transmitted through the lens. The ability to direct light from a large area is beneficial in optical wireless communications. For the receiver, the ability to direct light from a large area means a large collection area can be focused to a small photodiode without restricting the field of view. For the transmitter, the ability to direct light from a larger area means a higher eye-safe output power and better collimated beam can be used.

In the preferred embodiment, a rotatable mirror is placed between a laser diode (or photodiode) and a lens such that the optical path distance from the lens center to the mirror to the diode is near the focal length. In this manner, the cross-sectional area of light entering or exiting the system through the lens is increased relative to the mirror area.

BRIEF DESCRIPTIONS OF THE DRAWINGS

The above features of the present invention will be more clearly understood from consideration of the following descriptions in connection with accompanying drawings in which.

DETAILED DESCRIPTION OF A PREFERRED EMBODIMENT

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will be described in the context of an exemplary embodiment, that of an optical wireless communication system. A first way of directing light from a mirror will be discussed followed by improved alternatives. A brief discussion of exemplary applications will then be discussed.

In an optical wireless system, light is encoded with information and directed through free space from a transmitter to a receiver. In a system, as described in co-pending applications Ser. No. 09/621,385 filed Jul. 21, 2000, Ser. No. 09/620,943 filed Jul. 21, 2000, Ser. No. 09/940,763 filed Aug. 27, 2001, the receiver includes an analog mirror device that can be moved to optimize the receipt of the optical signal. Each of these three applications is incorporated herein by reference.

One problem of typical systems that use a mirror device is that the area of the mirror limits the area of light that can be reflected off of a rotatable mirror. The ability to direct light from a large area is beneficial in optical wireless communications. For the receiver, the ability to direct light from a large area means a large collection area can be focused to a small photodiode without restricting the field of view. For the transmitter, directing light from a larger area allows a higher eye-safe output power and a better collimated beam can be used.

Figure 1:
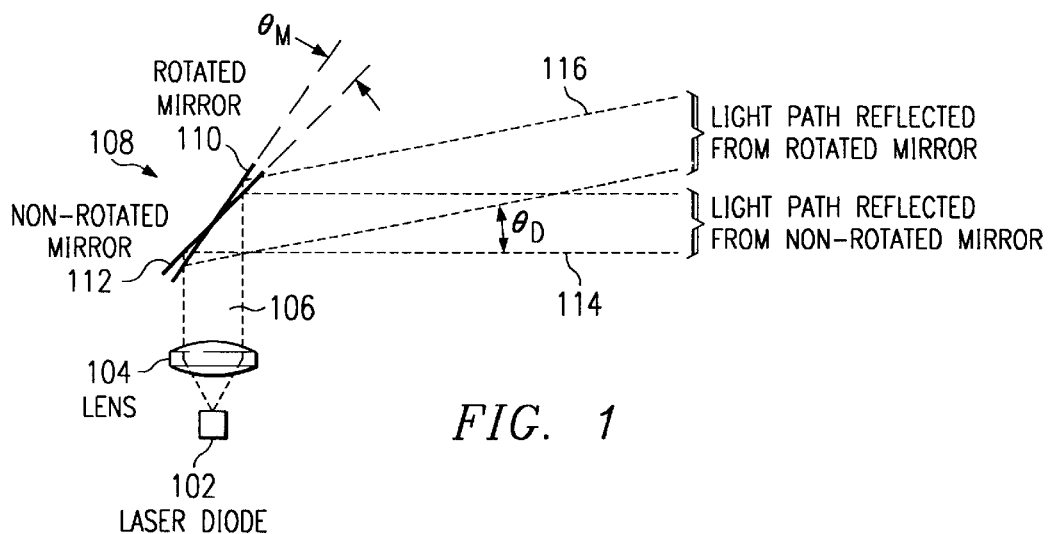
FIG. 1 shows an optical system.

FIG. 1 shows one way of using a rotatable mirror or other beam steering device to deflect a collimated beam. In the system 100 of FIG. 1, light is emitted from a light source 102. The light source 102 is typically a laser diode. The optical signal is modulated to carry information. While illustrated as a laser diode, other light sources, e.g., an light emitting diode (LED) or optical fiber, can be used and remain within the scope of the invention.

A lens 104 collimates light from the laser diode 102 such that the resulting beam 106 is smaller than the aperture of the mirror 108. If the beam 106 is larger than the aperture of mirror 108 then some of the light will not be reflected from the mirror and that power will be lost. Accordingly, the area of the mirror 108 limits the area of the deflected beam.

The mirror 108 is arranged to be able to rotate in at least two different directions. FIG. 1 shows the mirror aligned in two different positions, labeled 110 and 112. As shown in the figure, rotating the mirror reflects the beam in a different direction—the deflection angle $\Theta_B=2*\Theta_M$, where $\Theta_M$ is the rotation of the mirror. In other words, when mirror 108 is in the non-rotated position 112 the resulting beam 114 will be directed at a first angle. When the mirror 108 is in the rotated position 110, the resulting beam 116 will be directed at a second angle that is $\Theta_B$ adjusted from the first angle.

As indicated above, one limitation of this system is that the width of light beams 114 and 116 are limited by the area of mirror 108. One of the goals of manufacturing mirror 108, however, is to minimize the area of the mirror since lowering the area typically results in lowering the cost. This is especially true in the preferred embodiment where mirror 108 is formed from a single crystal silicon substrate.

Reversing the order of the mirror and lens can eliminate this limitation, such that the rotatable mirror deflects the light emitted by the laser diode before it reaches the lens. When the optical path distance from the lens center to the mirror to the light source is about the focal length, the beam exiting the lens will be nearly collimated.

Figure 2:
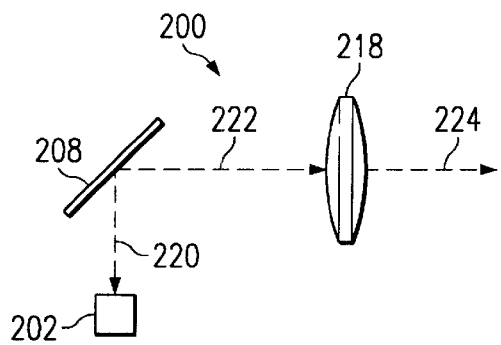
FIG. 2 shows a first embodiment configuration of the present invention.

Such an embodiment is shown in FIG. 2. As in FIG. 1, a light source 202 provides a light beam 220. The light beam 220 is directed toward mirror 208 without first reaching a collimating lens. From the mirror 208 light beam 222 is directed toward collimating lens 218 where the lens 218 collimates the beam for direction elsewhere in the system.

In the preferred embodiment, the mirror 208 is an analog mirror as described in U.S. Pat. No. 6,295,154, incorporated herein by reference. The preferred embodiment mirror has a mirror surface that is about 3 mm×3 mm in area. The mirror 208 includes two sets of hinges so that the mirror can tilt in an analog fashion. The mirror is preferably electromagnetically actuated. Light can be reflected in any angle out of a square cone. At present, the mechanical deflection angle of the mirror can be controlled within a range of about plus or minus five degrees to a resolution of about $\frac{1}{1000}^{th}$ of a degree.

In other embodiment, the mirror can tilt on only one set of hinges. Examples of a digital tilting mirror are provided in U.S. Pat. No. 5,083,857 issued Jan. 28, 1992 and entitled "Multi-level Deformable Mirror Device" and U.S. Pat. No. 5,061,049 issued Oct. 29, 1991 and entitled "Spatial Light Modulator and Method", both of which are incorporated herein by reference. The '049 patent teaches a mirror that can rotate between one of two positions. In other embodiments, the mirror could rotate to more positions.

Rotating the mirror 208 will result in a deflection of the collimated beam 24 exiting the lens 218. While the angle of reflection will be less than the angle in the embodiment of FIG. 1, e.g., $\Theta_B<2*\Theta_M$, the cross-sectional area of light entering or exiting the system 200 through the lens 218 can be larger than the mirror 208 area. This can be a valuable advantage in several instances, for example where the power per width is important as with eye safety.

Several examples of specific applications will now be provided.

Figure 3:
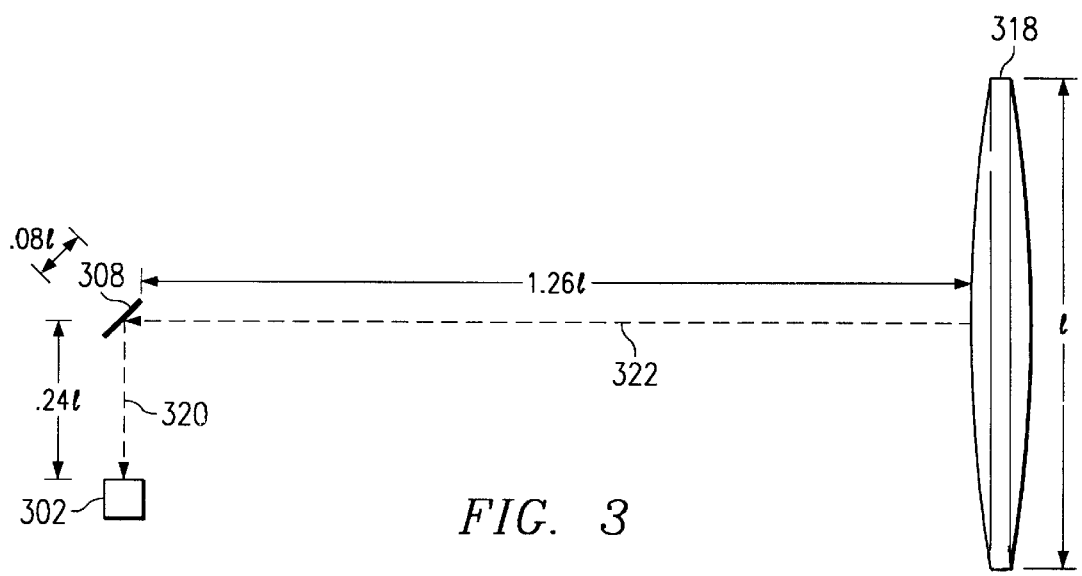
FIG. 3 shows a more particular embodiment with specific dimensions.

FIG. 3 shows an embodiment using a VCSEL (vertical cavity surface emitting laser) laser diode 302 (e.g., Lasermate VCT-F85A41) with a divergence of ±5°, coupled with an f/1.5 lens 318. All lengths are referenced to l, the aperture of the lens 318. A rotatable mirror 308 of length 0.08 l is place at a zero deflection angle of 45°, with the center (pivot point) a distance of 1.26 l from the center of the lens 318 on the axis of the lens. The laser 320 is placed a distance 0.24 l from the axis of the lens, directly below the pivot point. In this case, the total distance traveled by light going from laser 302 to lens 318 is the sum of the lengths of light beams 220 and 222 or 0.24 l+1.26 l=1.5 l, the focal length of lens 318.

Throughout the specification the lens 318 (or lens 218 or lens 518) is referred to as though a single lens is used. While it is certainly possible to include a single lens, the present invention is broad enough to include the embodiment where two or more lenses can be used in combination, e.g., to simulate a single lens. As a result, the term "lens" is intended to mean one or more lenses. As an example, a multiple lens system would have an effective focal length. This focal length can be used in positioning the various components of FIG. 3, or the other embodiments.

Figure 4A:
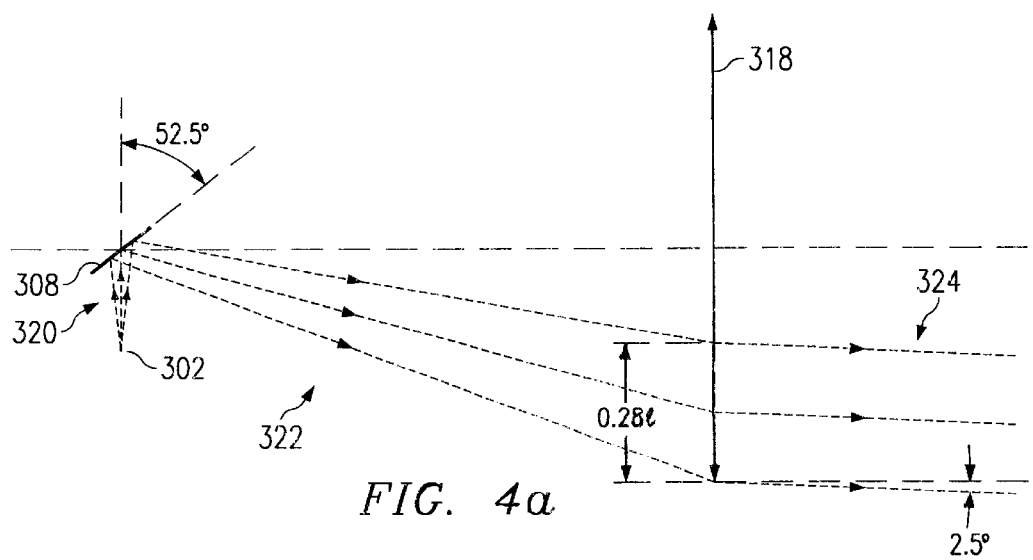
FIGS. 4a–4c show three different directional configurations of the system of FIG. 3.
Figure 4B:
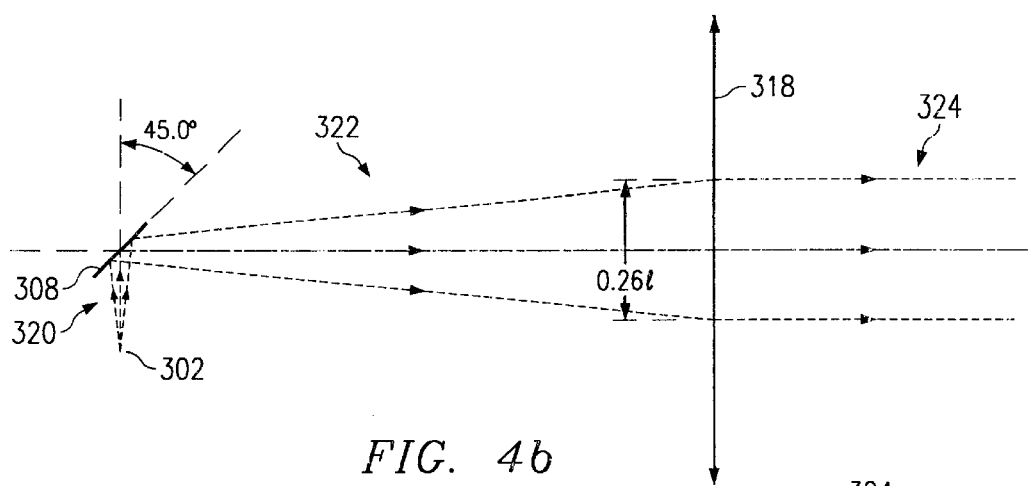
Figure 4C:
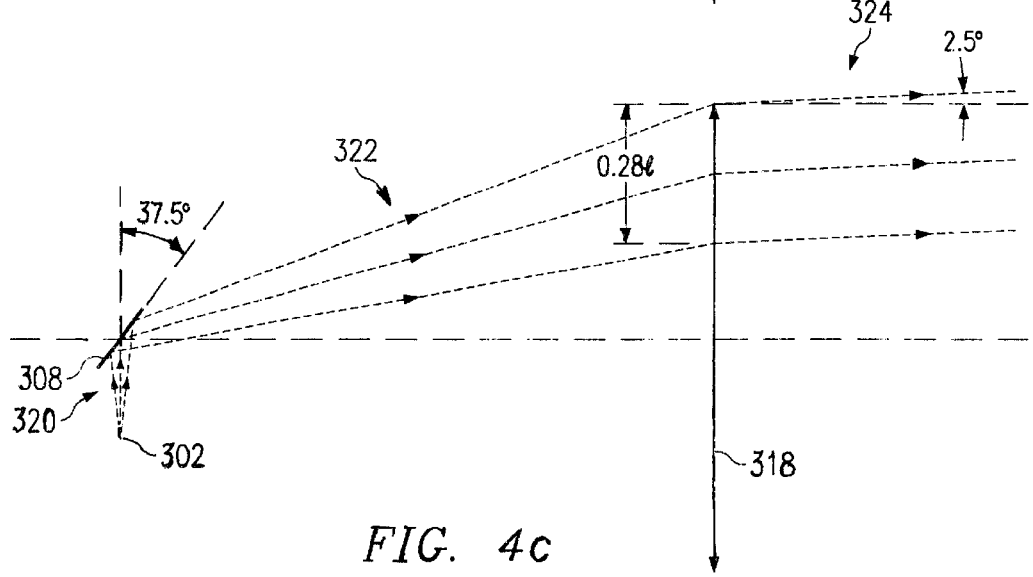

FIGS. 4a, 4b and 4c show the optical path for outgoing light when the mirror 308 is rotated to 37.5°, 45° and 52.5°, which results in collimated beams of light −2.5°, 0° and 2.5° off axis, respectively. The cross-sectional area of the light as it exits the lens is about ten and a half times the mirror area.

Referring to these three figures together, light is emitted from light source 302. Outgoing beam 320 begins from a point and diverges as it travels toward mirror 308. When the beam 320 reaches the mirror 308, it preferably has a beam width that is about the same at the area of the mirror 308. This design feature maximizes the size of the outgoing beam 324 for a particular size mirror.

Light beam 322 is reflected from mirror 308 and travels toward lens 318. Since the light beam 322 has not yet been collimated, it will continue to diverge. In other words, the size of the light beam 322 when it reaches lens 318 will be greater than its size when it left mirror 308. This is shown in the figures where each light beam 320, 322 and 324 is illustrated by three lights, one showing the center axis and the others showing the outer extent of the beam.

Figure 5:
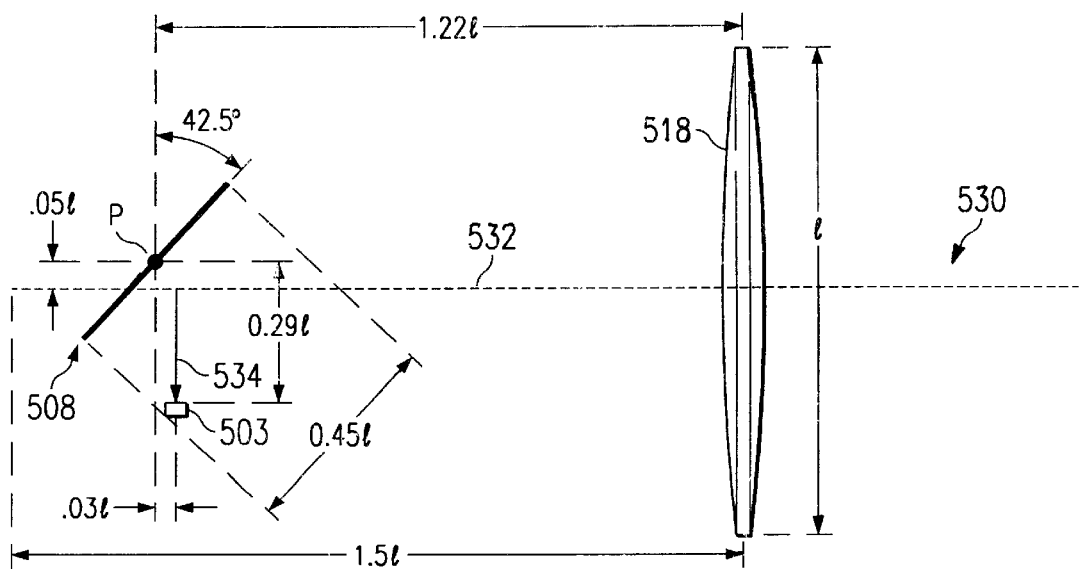
FIG. 5 shows a receiver embodiment.

The same concept of placing a rotatable mirror between the lens and focal point can be used to collect incoming light from a range of angles and focus it to a small detector. FIG. 5 is provided to show a specific embodiment. As with the transmitter, this receiver configuration will apply in dimensions other than those shown in the example of FIG. 5.

Referring now to FIG. 5, a light beam 530 is directed toward lens 518. This light beam is typically collimated light that will be focused down to be received at a small photodetector 503. Light beam 532 travels from lens 518 to mirror 508. Mirror 508 re-directs the light toward the photodetector 503. This results in the light 534 being focused to a point at the photodetector 503, which allows for the use of a very small (and therefore high speed) photodiode.

In the illustrated embodiment, the goal is to receive the light 534 at a photodiode 503. In other embodiments, the light 534 could be directed to other light collection devices. For example, light beam 534 could be directed toward a mirror (or an array of mirrors) and from there reflected toward other components in the system. An advantage of this system is that the light that hits the mirror could be very finely focused, thereby allowing for a very small mirror. In another embodiment, the light 534 could be directed toward a fiber optic.

In this embodiment, the area of incoming light 530 is decoupled from the area of the rotatable mirror 508 by placing the rotatable mirror 508 between the lens 518 and the photodiode 503 such that the mirror 508 deflects the light partially focused by the lens 518 to the photodiode 503. When the optical path distance from the lens center to the mirror to the photodiode is the focal length, the light will be focused to a small area at the photodiode.

FIG. 5 also includes dimensions for a specific example. In this embodiment, lens 518 has a focal length of 1.5 l (a f/1.5 lens). As before, all lengths referenced to 1, the aperture of the lens 518. The rotatable mirror 508 has a length of 0.45 l and is placed at a zero deflection angle of 42.5°, relative to the center axis of light beam 534. The center (pivot point) P of the lens is placed 1.22 l from the center of the lens 518 and 0.05 l above the axis of the lens. The photodiode 503 is placed a distance 0.29 l below the axis of the lens and 1.19 l from the center of the lens. The photodiode 503 is also shifted 0.03 l towards the lens 518 from the mirror pivot point P.

Figure 6A:
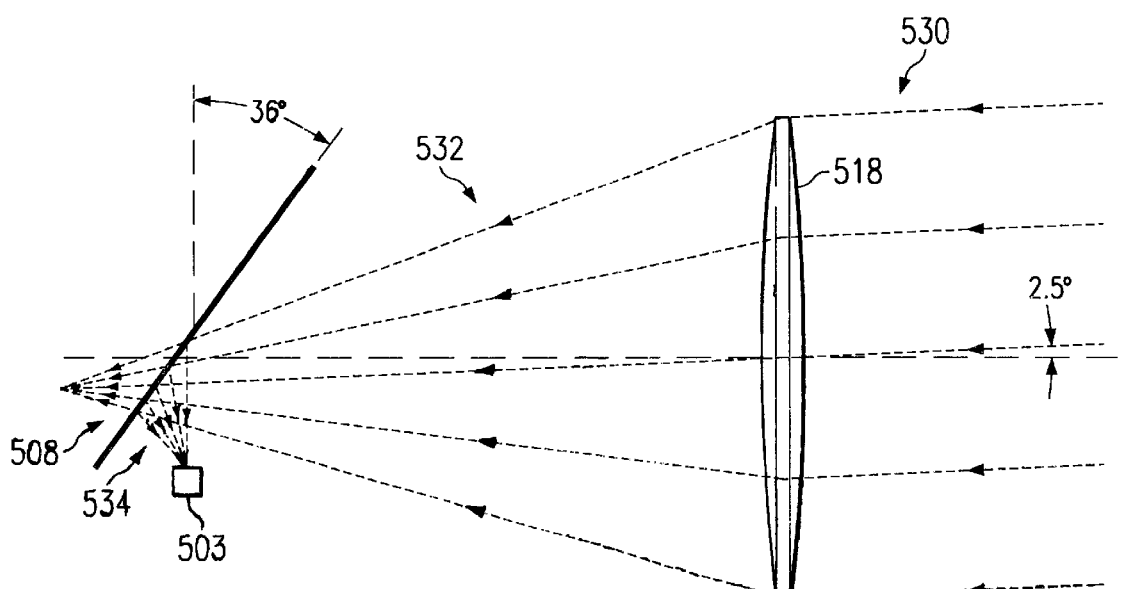
FIGS. 6a–6c show three different directional configurations of the system of FIG. 5.
Figure 6B:
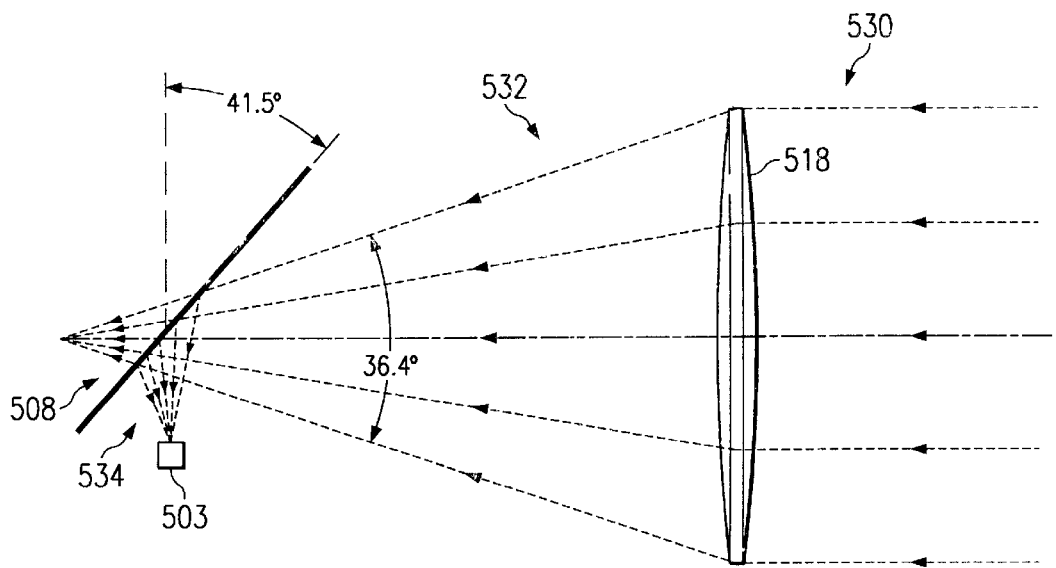
Figure 6C:
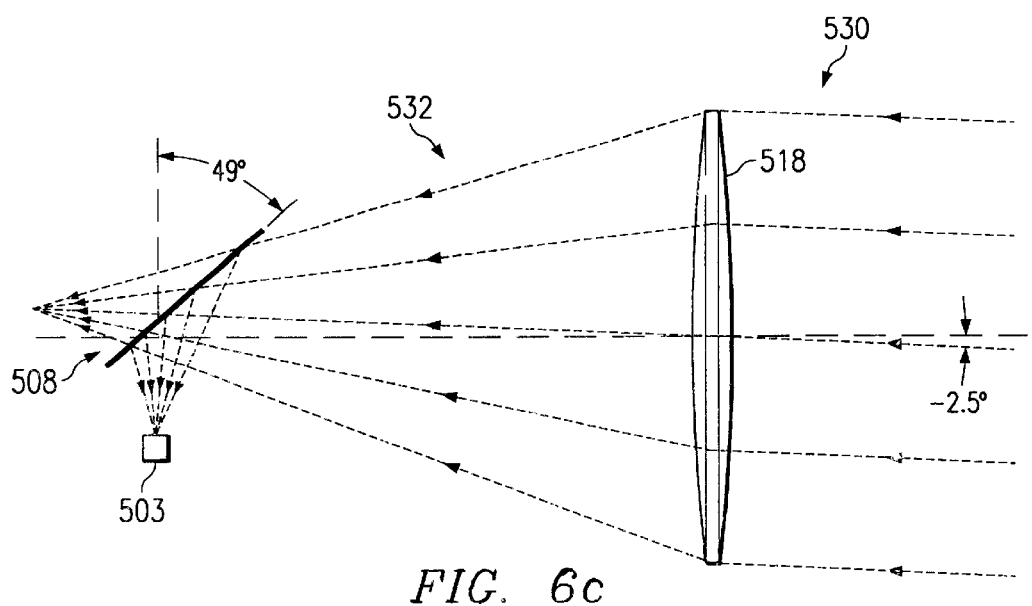

FIGS. 6a, 6b, and 6c show the optical path for incoming light when the mirror is rotated to 36°, 41.5° and 49°, respectively. This configuration collects incoming light from the 2.5°, 0° and −2.5° directions, respectively. The area collected by the lens is about five times the mirror area.

The optical systems of the present invention could be used in a wide variety of applications. As a first example, co-pending application Ser. No. 09/839,690, filed Apr. 20, 2001 and incorporated herein by reference) teaches an optical wireless system that can be used, in one aspect, as a local area network (LAN). The configuration discussed here could be utilized in an optical wireless LAN.

As another example, co-pending application Ser. No. 10/060,666, filed Jan. 29, 2002 and incorporated herein by reference, teaches an optical system that can be used as an add-drop multiplexer. Aspects of the present invention can be incorporated into an optical system such as an optical add-drop multiplexer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical system comprising:
   a light source;
   a pivotable mirror disposed to receive a light beam from the light source, the pivotable mirror being placed a first distance from the light source; and
   a collimating lens disposed to receive a reflected light beam from the pivotable mirror, the collimating lens being placed a second distance from the pivotable mirror, the collimating lens having a focal length, wherein the focal length is about equal to the sum of the first distance and the second distance.

2. The system of claim 1 wherein the pivotable mirror is pivotable along one axis between two positions.

3. The system of claim 1 wherein the pivotable mirror is rotatable along two axes.

4. The system of claim 3 wherein the reflected light can be reflected in any angle out of a square cone.

5. The system of claim 1 wherein the pivotable mirror is fabricated from silicon.

6. The system of claim 1 wherein the pivotable mirror is electromagnetically actuated.

7. The system of claim 1 wherein a light beam that is transmitted through the collimating lens has a beam width that is more than three times the size of a mirror surface of the pivotable mirror.

* * * * *